(12) United States Patent
Shimizu et al.

(10) Patent No.: US 10,490,081 B2
(45) Date of Patent: Nov. 26, 2019

(54) APPARATUS FOR MONITORING ADJACENT LANES

(71) Applicant: DENSO CORPORATION, Kariya, Aichi-pref. (JP)

(72) Inventors: Naotsugu Shimizu, Kariya (JP); Koichiro Suzuki, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 33 days.

(21) Appl. No.: 15/521,002

(22) PCT Filed: Sep. 29, 2015

(86) PCT No.: PCT/JP2015/077487
§ 371 (c)(1),
(2) Date: Apr. 21, 2017

(87) PCT Pub. No.: WO2016/063687
PCT Pub. Date: Apr. 28, 2016

(65) Prior Publication Data
US 2017/0345312 A1 Nov. 30, 2017

(30) Foreign Application Priority Data
Oct. 24, 2014 (JP) .................................. 2014-217277

(51) Int. Cl.
*G01S 13/93* (2006.01)
*G08G 1/16* (2006.01)
(Continued)

(52) U.S. Cl.
CPC ............. *G08G 1/167* (2013.01); *B60R 21/00* (2013.01); *B60W 30/18163* (2013.01);
(Continued)

(58) Field of Classification Search
None
See application file for complete search history.

(56) References Cited

U.S. PATENT DOCUMENTS

| | | | | |
|---|---|---|---|---|
| 6,269,308 | B1 * | 7/2001 | Kodaka | B62D 15/0265 340/435 |
| 2012/0150437 | A1 * | 6/2012 | Zeng | B60W 30/12 701/456 |

FOREIGN PATENT DOCUMENTS

| | | |
|---|---|---|
| JP | 2005-257314 | 9/2005 |
| JP | 2005-257314 A | 9/2005 |

(Continued)

OTHER PUBLICATIONS

Yenikaya et al., "Keeping the Vehicle on the Road—A Survey on On-Road Lane Detection Systems", 2013, ACM Computing Surveys, vol. 46, No. 1, Article 2, p. 2:4-2:6 (Year: 2013).*

*Primary Examiner* — Tamara L Weber
(74) *Attorney, Agent, or Firm* — Knobbe, Martens, Olson & Bear, LLP

(57) ABSTRACT

In an apparatus for monitoring an adjacent lane to a lane in which an own vehicle that is a vehicle carrying the apparatus is traveling, a travel trajectory calculation unit calculates a travel trajectory of the own vehicle based on odometry information of the own vehicle. An adjacent lane estimation unit estimates an adjacent-lane region based on the travel trajectory of the own vehicle. An other-vehicle determination unit determines whether or not a target (the other vehicle) is present in the adjacent lane based on a position of the target detected by an other-vehicle detector and the estimated adjacent-lane region.

6 Claims, 8 Drawing Sheets

(51) Int. Cl.
    *B60R 21/00*     (2006.01)
    *B60W 40/04*     (2006.01)
    *G01S 13/87*     (2006.01)
    *G07C 5/08*     (2006.01)
    *B60W 30/18*     (2012.01)

(52) U.S. Cl.
    CPC ............ *B60W 40/04* (2013.01); *G01S 13/87* (2013.01); *G01S 13/878* (2013.01); *G01S 13/931* (2013.01); *G07C 5/0841* (2013.01); *G01S 2013/9332* (2013.01); *G01S 2013/9353* (2013.01)

(56) References Cited

FOREIGN PATENT DOCUMENTS

| | | |
|---|---|---|
| JP | 2011-048641 | 3/2011 |
| JP | 2011-48641 A | 3/2011 |
| JP | 2013-159246 | 8/2013 |
| JP | 2013-159246 A | 8/2013 |
| JP | 2015-161967 | 9/2015 |
| JP | 2015-161967 A | 9/2015 |

\* cited by examiner

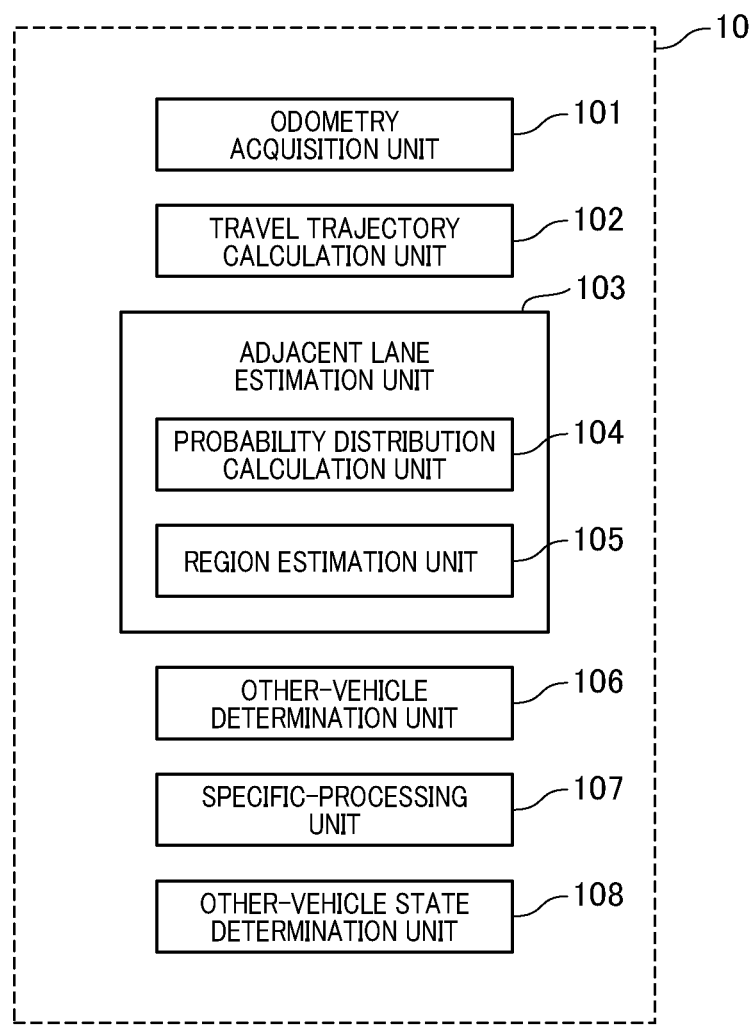

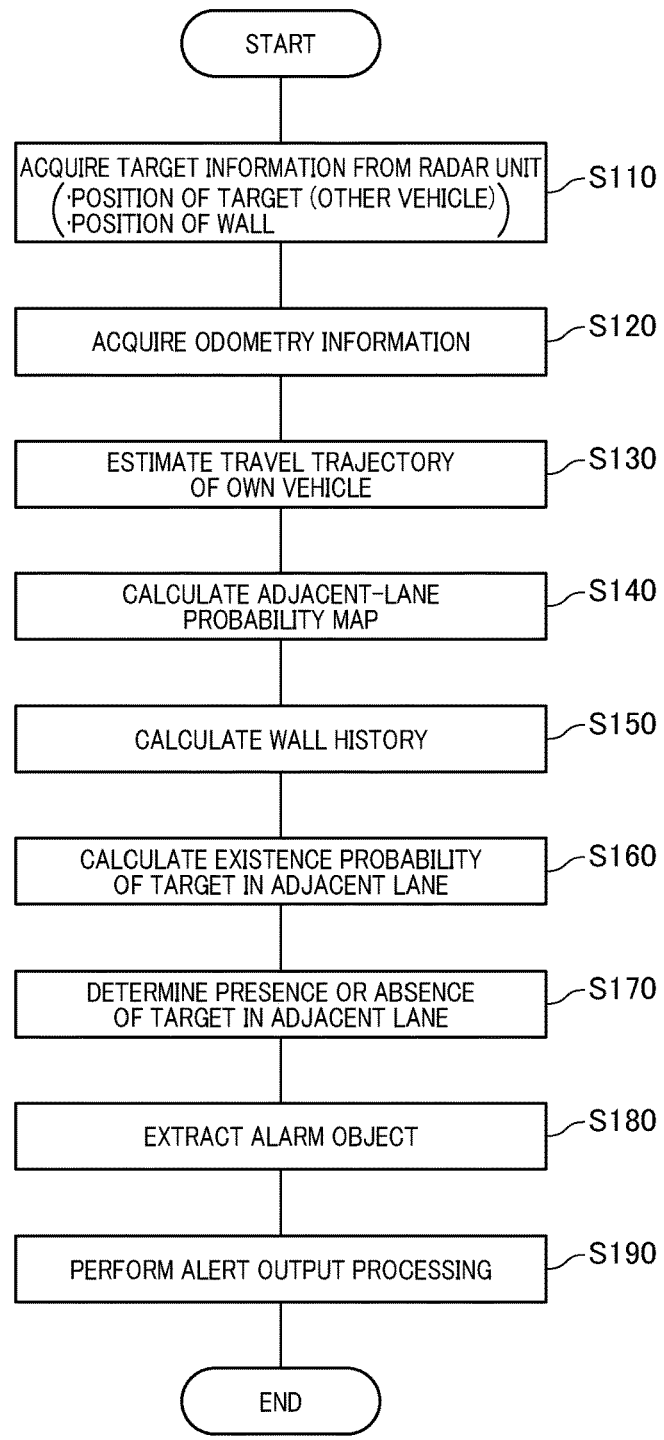

APPARATUS FOR MONITORING ADJACENT LANES

CROSS-REFERENCE TO RELATED APPLICATION

This application is based on and claims the benefit of priority from earlier Japanese Patent Application No. 2014-217277 filed Oct. 24, 2014, the description of which is incorporated herein by reference.

TECHNICAL FIELD

The present invention relates to an apparatus for monitoring the presence or absence of a vehicle in a lane other than a lane in which an own vehicle lies.

BACKGROUND ART

Various techniques have been proposed for detecting a position of an own-vehicle along a traveled path. Patent literature 1 discloses a technique for estimating a position of the own vehicle along a traveled path not using any sensors for observing the external environment, such as a GPS device and a camera, but using odometry information of the own vehicle regarding a vehicle speed, a yaw angle, a steering angle and others. The estimation of the position of the own-vehicle along the traveled path may be utilized in various systems for improving driving safety, such as a lane departure warning system and a lane keeping system.

CITATION LIST

Patent Literature

[Patent Literature 1] JP-A-2013-159246

SUMMARY OF THE INVENTION

Technical Problem

To assist a driver of the own vehicle in higher level safe driving, it would be advantageous to estimate not only the position of the own-vehicle, but also a position of a vehicle other than the own vehicle in a roadway. For example, it would be advantageous that when making a lane change to an adjacent lane, the own vehicle can detect whether or not a vehicle other than the own vehicle is traveling in the adjacent lane in the rearwards direction.

For example, a technique has already been demonstrated such that a radar unit is provided at the rear of the own vehicle to thereby detect the presence of a vehicle other than the own vehicle (e.g., a distance and a direction from the own vehicle to the other vehicle). With such a technique to detect the other vehicle using the radar unit, it is difficult to detect whether or not the other vehicle is traveling in a lane adjacent to a lane in which the own vehicle is traveling.

In consideration of the foregoing, exemplary embodiments of the present invention are directed to providing an apparatus for monitoring an adjacent lane to a lane in which an own vehicle is traveling, capable of properly estimating whether or not a vehicle other than the own vehicle is present in the adjacent lane.

Solution to Problem

In accordance with an exemplary embodiment of the present invention, there is provided an apparatus for monitoring an adjacent lane to a lane in which an own vehicle that is a vehicle carrying the apparatus is traveling. The apparatus includes an other-vehicle detector, an odometry acquisition unit, a travel trajectory calculation unit, an adjacent lane estimation unit, and an other-vehicle determination unit.

The other-vehicle detector is configured to detect other-vehicle position information indicative of a position of an other vehicle around the own vehicle relative to the own vehicle. The odometry acquisition unit is configured to acquire odometry information indicative of a driving state of the own vehicle. The travel trajectory calculation unit is configured to, based on the odometry information acquired by the odometry acquisition unit, calculate a travel trajectory of the own vehicle. The adjacent lane estimation unit is configured to, based on the travel trajectory of the own vehicle calculated by the travel trajectory calculation unit, estimate an adjacent-lane region that is a region where the adjacent lane is present. The other-vehicle determination unit is configured to, based on the other-vehicle position information detected by the other-vehicle detector and the adjacent-lane region estimated by the adjacent lane estimation unit, determine whether or not the other vehicle is present in the adjacent lane.

In the adjacent lane monitoring apparatus configured as above, the travel trajectory of the own vehicle is calculated based on the odometry information, and the adjacent-lane region is estimated based on the travel trajectory of the own vehicle, Meanwhile, the other-vehicle position information is detected by the other-vehicle detector. The determination as to whether or not the other vehicle is present in the adjacent lane is made based on the adjacent-lane region and the other-vehicle position information.

With the adjacent lane monitoring apparatus configured as above, whether or not a vehicle other than the own vehicle is present in the adjacent lane can be properly estimated.

The above and other objects, the features and advantages of the present invention will be readily apparent and fully understood from the following detailed description of preferred embodiments, taken in connection with the appended drawings.

BRIEF DESCRIPTION OF DRAWINGS

FIG. 1B is a functional block diagram of a control unit in a driver assistance ECU;

FIG. 2 is a flowchart of adjacent lane monitoring processing;

DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

(1) Vehicle-Mounted System Configuration

Figure 1A:
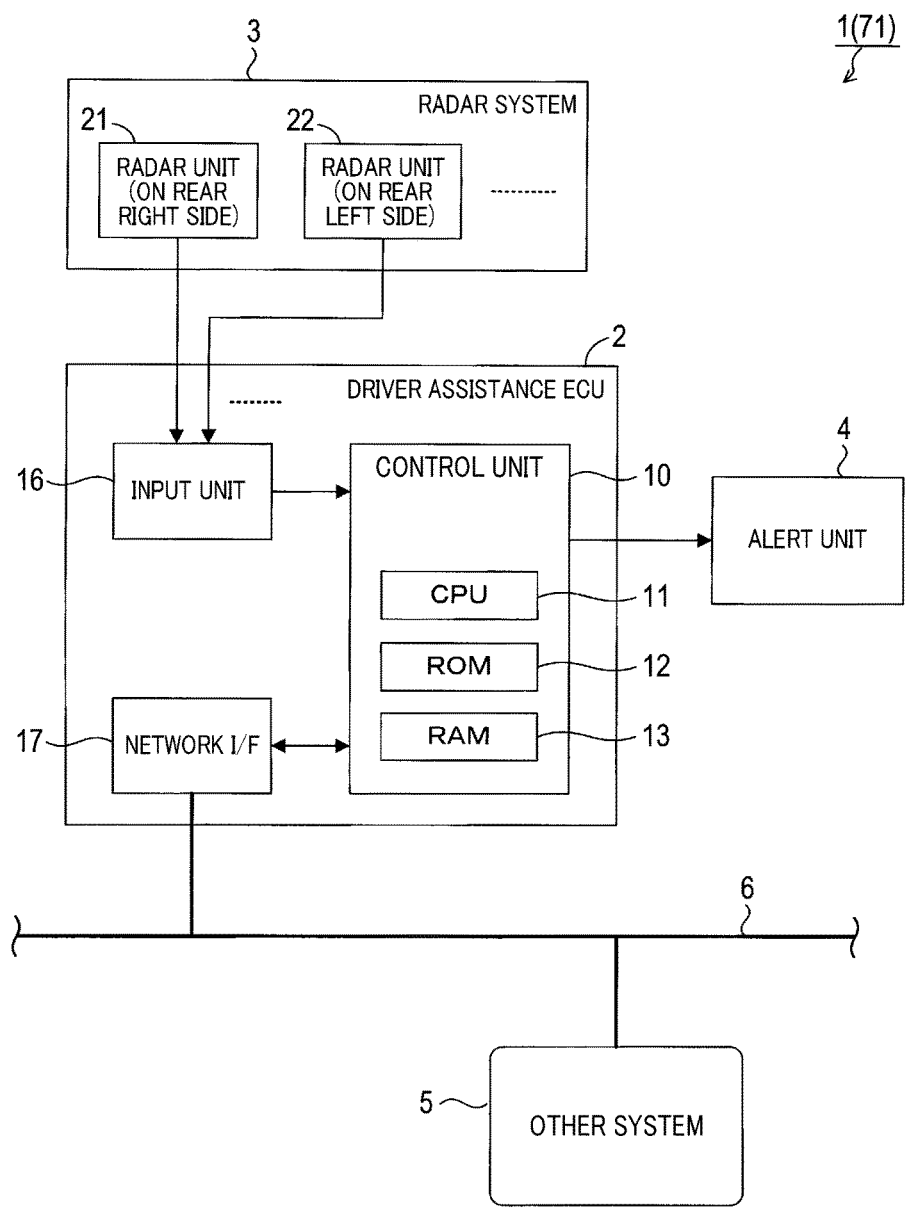
FIG. 1A is a block diagram of a vehicle-mounted system in accordance with one embodiment of the present embodiment.

A vehicle-mounted system 1 in accordance with the present embodiment shown in FIG. 1A includes a driver assistance electronic control unit (ECU) 2, a radar system 3, an alert unit 4, and an other control system 5. The vehicle-mounted system 1, in the present embodiment, is mounted in a vehicle 71 (see FIG. 7) that is a four-wheel automobile. The vehicle 71 carrying the vehicle-mounted system 1 will hereinafter be referred to as an own vehicle.

The radar system 3 includes a plurality of radar units 21, 22, . . . . In the present embodiment, the radar system 3 includes at least a rear right radar unit 21 placed on the rear right side of the vehicle 71 and a rear left radar unit 22 placed on the rear left side of the vehicle 71. The rear right radar unit 21 acquires information regarding objects on the right side of the vehicle 71 (as well as objects on the rear right side of the vehicle 71). The rear left radar unit 22 acquires information regarding objects on the left side of the vehicle 71 (as well as objects on the rear left side of the vehicle 71). In cases where target information regarding objects present over the whole region on the rear side of the vehicle 71 (including predefined regions on the rear right and rear left sides of the vehicle 71) can be acquired using a single radar unit, the single radar unit may be used instead of the two radar units 21, 22.

The plurality of radar units 21, 22, . . . included in the radar system 3 have essentially the same configuration and function. In the following, therefore, the rear right radar unit 21 will be described as representative of all these radar units.

The rear right radar unit 21 is configured to emit radar waves and receive reflected waves, and based on the reflected waves, calculate target information regarding a target that has reflected the radar waves to input the information to the driver assistance ECU 2. Target information to be calculated by the rear right radar unit 21 may include a distance D from the own vehicle 71 to the target and a relative speed V of the target with respect to the own vehicle 71, and an azimuthal angle $\varphi$ of the target with respect to the own vehicle 71.

Target detection methods employed in the radar units include, but are not limited to, the FMCW technique and the two-frequency CW technique. In the present embodiment, as an example, the rear right radar unit 21 configured as a millimeter-wave radar using the FMCW technique will now be described.

The FMCW millimeter-wave radar is well-known. Therefore, its overview will be described briefly. In the rear right radar unit 21, a transmit signal having a triangular waveform is emitted as a radar wave from a transmit antenna. More specifically, the transmit signal is configured such that each period of the transmit signal includes an ascent interval in which the frequency is linearly increasing with time and a descent interval in which the frequency is linearly decreasing with time from the end of the ascent interval (at this timing the frequency reaches a maximum frequency). The transmit signal is split into two parts, one of which is transferred to the transmit antenna to be emitted as a radar wave and the other of which is used as a local signal to process a received signal.

The reflected wave that has emitted from the transmit antenna and then reflected from a target is received at a plurality of reviving antennas. A received signal received at each receiving antenna is mixed with the local signal, thereby generating a beat signal at each receiving antenna. A signal processing circuit calculates target information D, v, $\varphi$ based on the beat signals using known signal processing method. The rear right radar unit 21 outputs the calculated target information D, v, $\varphi$ to the driver assistance ECU 2.

The other control system 5 is mounted in the vehicle 71 and includes a plurality of ECUs other than the driver assistance ECU 2. That is, in the present embodiment, the other ECUs than the driver assistance ECU 2 is herein collectively referred to as the other control system 5.

The driver assistance ECU 2 is data communicatively connected to the other control system 5 via the network 6. In the present embodiment, the network 6 may be a well-known CAN as an in-vehicle network.

Various odometry information is regularly submitted from the other control system 5 to the network 6. The driver assistance ECU 2 can acquire the odometry information transmitted regularly onto the network 6, the odometry information includes a speed v of the vehicle 71 (referred to as a vehicle speed), a yaw rate $\omega$ of the vehicle 71, a steering angle of the vehicle 71, and a turning radius R vehicle 71 and others.

The other control system 5 calculates the vehicle speed v based on a detection signal from a vehicle speed sensor (not shown) and regularly submits the calculation result (vehicle speed data) to the network 6. The other control system 5 calculates the yaw rate $\omega$ based on a detection signal from a yaw rate sensor (not shown) and regularly submits the calculation result (yaw rate data) to the network 6. The other control system 5 calculates the steering angle based on a detection signal from a steering angle sensor (not shown) and regularly submits the calculation result (steering angle data) to the network 6. The other control system 5 calculates the turning radius R using a predetermined R calculation method based on the steering angle and regularly submits the calculation result (R data) to the network 6. The R calculation method is one of various R calculation methods. As an example of the predetermined R calculation method, the turning radius R may be calculated with reference to a table prestoring a relationship between each steering angle and its corresponding turning radius R. In an alternative embodiment, the driver assistance ECU 2 may use the table to calculate the turning radius R based on the steering angle acquired via the network 6.

The driver assistance ECU 2 includes a control unit 10, an input unit 16, and a network interface (hereinafter abbreviated to "network I/F") 17. The input unit 16 outputs the target information received from the respective radar units 21, 22, . . . forming the radar system 3 to the control unit 10. The network I/F 17 is a communication I/F for the control unit 10 to data communicate with the control system 5 via the network 6.

The control unit 10 performs various processing based on the target information D, V, $\varphi$ received from the respective radar units 21, 22 forming the radar system 3 via the input unit 16.

The control unit 10 has an adjacent lane monitoring function. The adjacent lane monitoring function is a function to determine whether or not a vehicle other than the own vehicle is traveling in a lane adjacent (or an adjacent lane) to a lane in which the own vehicle is traveling, and if a vehicle other than the own vehicle is traveling in such an adjacent lane and if a driving state of the other vehicle satisfies a predefined condition, then activate the alert unit 4 to output an alert. The odometry information acquired from the other control system 5 via the network 6 and the target information acquired from the radar system 3 (mainly, from the rear right radar unit 21 and the rear left radar unit 22) are also used to implement the adjacent lane monitoring function.

The control unit 10 includes CPU 11 that excites various programs to perform corresponding processing, ROM 12 storing the various programs, and RAM 13 used as a workspace while the CPU 11 is performing the processing. An electrically data rewritable nonvolatile memory, such as flash memory, may be used as the ROM 12. The adjacent lane monitoring processing program to implement the above adjacent lane monitoring function is stored in the ROM 12. The adjacent lane monitoring function can be implemented by the CPU 11 executing the adjacent lane monitoring processing program.

(2) Overview of Adjacent Lane Monitoring Processing

The adjacent lane monitoring processing to be performed in the control unit 10 will now be described with reference to FIG. 2. The control unit 10 is actually configured to monitor adjacent lanes on the right and left hand sides of the own vehicle. For brevity, the adjacent lane monitoring processing will be described when applied only to the adjacent lane on the right hand side of the own vehicle. This processing can also be applied to the adjacent lane on the left hand side of the own vehicle.

The CPU 11 of the control unit 10, after launch, reads the program for the adjacent lane monitoring processing of FIG. 2 from the ROM 12, and performs this processing every predetermined control period T. After initiation of the adjacent lane monitoring processing by the CPU 11 of the control unit 10, the control unit 10, in step S110, acquires target information from the radar unit (i.e., the rear right radar unit 21) via the input unit 16. The target information includes a position of the vehicle other than the own vehicle (a relative position with respect to the own vehicle) and a position of a wall. The position of the wall is a position of a target in the case that the wall is detected as a target on the right hand side of the own vehicle (a relative position with respect to the own vehicle, e.g., coordinates with origin at the position of the own vehicle). Acquiring the position of the wall allows a direction and a distance W from the own vehicle to the wall to be calculated.

In step S120, the control unit 10 (precisely, the CPU 11 of the control unit 10) acquires odometry information from the other control system 5 via the network 6. As above, the odometry information includes at least a vehicle speed v, a yaw rate ω, a steering angle, and a turning radius R.

In step S130, the control unit 10 estimates a travel trajectory of the own vehicle. More specifically, the control unit 10 estimates a travel trajectory of the own vehicle for up to the previous predetermined number of cycles of control period T (for example, for up to the previous N cycles where N is a positive integer greater than one). In the present embodiment, as described later, the control unit 10 calculates estimated positions of the own vehicle relative to the current position of the own vehicle at the respective control timings for N cycles previous to the current cycle, using the odometry information acquired in step S120 (values acquired at the respective control timings for up to the previous N cycles). The control unit 10 estimates a line connecting the current position of the own vehicle and the estimated positions of the own vehicle, as a travel trajectory of the own vehicle.

It should be noted that errors may be associated with the odometry information acquired in step S120 including the vehicle speed v and the yaw rate ω, due to various factors, such as errors in detection by the vehicle speed sensor and the yaw rate sensor and noise. Therefore, in step S130, for each of the estimated positions (or estimates of positions) of the own vehicle at the respective timings for up to the previous N cycles, the control unit 10 also calculates an estimated range of existence of the estimated position of the own vehicle taking into account the errors in the odometry information. The estimated range of existence can be expressed as an error variance in the estimated position of the own-vehicle. In addition, projecting the error variance onto a lane-widthwise direction (that is a direction perpendicular to the travel direction) allows an existence probability of the estimated position of the own-vehicle in the lane-widthwise direction to be expressed as a predefined probability distribution centered at the estimated position of the own-vehicle.

In the present embodiment, the error variance in the estimated position of the own-vehicle due to the error factors for the odometry information is modeled as a normal probability distribution (i.e., Gaussian distribution). That is, the existence probability of the estimated position of the own-vehicle calculated using the odometry information yields a peak value with the highest probability in the normal probability distribution. Thus, the existence probability decreases with increasing lane-widthwise distance from the estimated position of the own-vehicle according to the normal probability distribution.

In step S140, the control unit 10 calculates an adjacent lane probability map. More specifically, for each of the estimated positions of the own vehicle at the respective control timings for up to the previous N cycles, the control unit 10 defines a position of the adjacent lane (more specifically, positions of both ends in the lane-widthwise direction), and projects the error variance in the estimated position of the own-vehicle onto the position of the adjacent lane, thereby calculating a probability distribution of the adjacent lane.

More specifically, the control unit 10 defines positions of two lane partition lines defining the adjacent lane (lane partition lines on both sides of the adjacent lane), that is, an inside estimated partitioning position that is an estimate of a position of the lane partition line proximal to the own vehicle (inside partitioning position) and an outside estimated partitioning position that is an estimate of a position of the lane partition line distal to the own vehicle (outside partitioning position). Thereafter, the control unit 10 simply projects the error variance in the estimated position of the own-vehicle onto each of the inside and outside estimated partitioning positions, thereby defining a lane-widthwise probability distribution of each of the inside and outside partitioning positions.

That is, for the inside partitioning position, the existence probability of the inside estimated partitioning position yields a peak value which corresponds to the highest probability in the normal probability distribution. The existence probability decreases with increasing lane-widthwise distance from the inside estimated partitioning position. Also, for the outside partitioning position, the existence probability yields a peak value which corresponds to the highest probability in the normal probability distribution. The existence probability decreases with increasing lane-widthwise distance from the outside estimated partitioning position.

The control unit 10 connects points of equal existence probability (e.g., points of predetermined existence probability P0) of the inside partitioning position at the respective control timings for up to the previous N cycles and connects points of equal existence probability (e.g., points of predetermined existence probability P0) of the outside partitioning position at the respective control timings for up to the previous N cycles, thereby calculating the adjacent lane probability map. This adjacent lane probability map represents a region where the existence probability of the adjacent lane is P0. That is, if a target is within such a region represented by the adjacent lane probability map, the existence probability of the target in the adjacent lane is determined to be P0.

In step S150, the control unit 10 calculates a wall history. More specifically, based on positions of a wall acquired in step S110 at the respective timings for up to the previous N cycles, the control unit 10 calculates the wall history that is a trajectory of a position of the wall.

In step S160, the control unit 10 calculates an existence probability of a target in the adjacent lane. More specifically, the control unit 10 calculates an existence probability distribution of a target based not only on the adjacent lane probability map calculated in step S140, but also on the wall history calculated in step S150. Basically, the control unit 10 calculates the existence probability of a target according to the adjacent lane probability map. However, in the presence of a wall, the existence probability of the adjacent lane is uniformly zero in a region outside of the wall. Accordingly, the existence probability of a target in the adjacent lane is zero.

In step S170, the control unit 10 determines the presence or absence of a target in the adjacent lane. More specifically, the control unit 10 determines the presence or absence of a target in the adjacent lane, based on the existence probability of a target calculated in step S160 and position information of a target detected in the radar unit. For example, if a target exists in a region where the existence probability of a target is equal to or greater than 70%, it is determined that the target is present in the adjacent lane. If a target exists in a region where the existence probability of a target is less than 70%, it is determined that the target is not present in the adjacent lane.

In addition, in an example of FIG. 5 described later, where the existence probability of the adjacent lane takes one of P1, P2, P3 (where P1>P2>P3) and there exist three regions, that is, a region with the existence probability of P1, a region with the existence probability of P2, and a region with the existence probability of P3. For example, if a target exists in the region with the existence probability of P1 or more, it may be determined that the target is present in the adjacent lane.

In step S180, the control unit 10 extracts an alarm object in a particular state to the own vehicle. More specifically, if in step S170 it is determined that a target exists in the adjacent lane, the control unit 10 checks a positional relationship between the target and the own vehicle. If the positional relationship between the target and the own vehicle satisfies a predefined condition, the control unit 10 extracts the target as an alarm object. The predefined condition may be one of a first condition that a relative distance of the target with respect to the own vehicle is equal to or less than a predetermined distance, a second condition that a rate of decrease in the relative distance is equal to greater than a decrease rate threshold (that is, the target is fast approaching the own vehicle), and a third condition that the first and second conditions are both met.

In step S190, the control unit 10 performs the alert output processing. More specifically, if in step S180 an alarm object is extracted, the control unit 10 performs specific processing to trigger the alert unit 4 to output an alert indicating the presence of the alarm object.

(3) Details of Adjacent Lane Monitoring Processing

The adjacent lane monitoring processing will now be described in more detail with reference to FIG. 2.

In the following, various processing will be described using various equations. A time (timing) t, a yaw rate $\omega(t)$, a vehicle speed $v(t)$, an attitude angle $\theta(t)$, an amount of attitude angle change $\Delta\theta(t)$, and a turning radius R are defined according to the following equations (1)-(6).

(Eq. 1)

$$t = [0, -T, -2T, \ldots ] \quad (1)$$

$$\omega(t) = [\omega(0), \omega(-T), \omega(-2T), \ldots ] \quad (2)$$

$$v(t) = [v(0), v(-2T), \ldots ] \quad (3)$$

$$\theta(t) = [0, -\omega(0)T, -(\omega)(0)+\omega(-T))T, \ldots ] \quad (4)$$

$$\Delta\theta(t) = \omega(t) \cdot T \quad (5)$$

$$R(t) = v(t)/\omega(t) \quad (6)$$

In the present embodiment, as described above, various processing is performed based on the estimated positions of the own vehicle at the respective control timings for up to the previous N cycles (i.e., during a period of t=0 to t=−NT). The turning radius R defined by the equation (6) is used in the following description. Alternatively, the turning radius R acquired from the other control system 5 via the network 6 may be used.

(3-1) Estimation of Travel Trajectory of Own Vehicle (S130)

In step S130, using the following equation (7), the estimated positions of the own vehicle x at the respective timings for up to the previous N cycles with respect to the current position of the own vehicle (origin) are calculated.

(Eq. 2)

$$x(-n+1)T) = Rot_{-\Delta\theta}x(-nT) + (Rot_{-\Delta\theta} - I)[R,0]^T \quad (7)$$

where $$x(0) = 0$$

Figure 3:
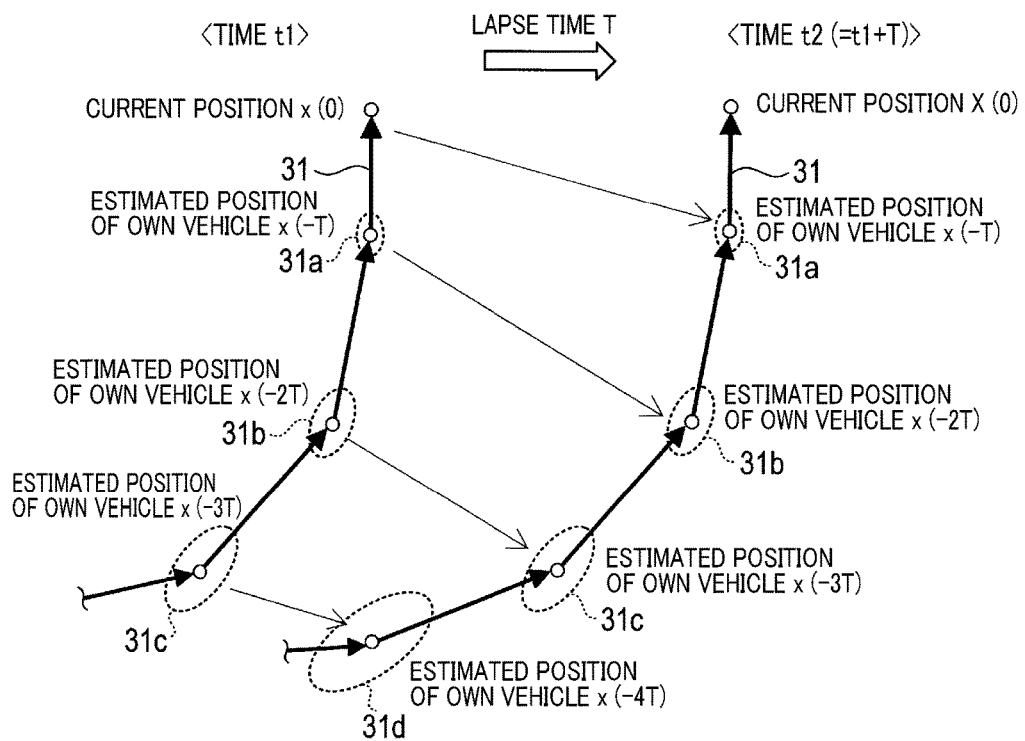
FIG. 3 is an explanatory view illustrating estimation of a travel trajectory of an own vehicle.

That is, as exemplified in FIG. 3, at control timing of time t1, the control unit 10 uses the equation (7) to calculate the estimated positions of the own vehicle at the respective timings for N cycles prior to the current cycle relative to the position of the own vehicle (origin) at time t1. A line connecting the estimated positions of the own-vehicle yields the travel trajectory 31 of the own vehicle.

Further, taking into account errors in the odometry information, the control unit 10 calculates estimated ranges of existence (error variances) 31a, 31b, 31c . . . for the respective estimated positions of the own vehicle calculated as above. More specifically, the control unit 10 defines an error distribution for the yaw rate w and an error distribution for the vehicle speed v according to the equations (8), (9).

(Eq. 3)

$$\tilde{\omega} \sim N(0, \sigma_\omega^2) \quad (8)$$

$$\tilde{v} \sim N(0, \sigma_v^2) \quad (9)$$

Then, an estimate (a value taking into account the error variance) of the amount of attitude angle change $\Delta\theta$ can be expressed as the equation (10).

(Eq. 4)
$$\Delta\hat{\theta} = \hat{\omega}T = (\omega + \tilde{\omega})T \quad (10)$$

Thus, taking into account errors in the odometry information, the first and second terms on the right hand side of the equation (7) can be expressed as the equations (11), (12), respectively.

(Eq. 5)
$$(Rot_{-\Delta\hat{\theta}} - I)[\hat{R}, 0]^T \cong \begin{bmatrix} 0 & \Delta\hat{\theta} \\ -\Delta\hat{\theta} & 0 \end{bmatrix} \begin{bmatrix} \hat{v}T/\Delta\hat{\theta} \\ 0 \end{bmatrix} = \begin{bmatrix} 0 \\ -\hat{v}T \end{bmatrix} \quad (11)$$

$$Rot_{-\Delta\hat{\theta}}\hat{x}(-nT) \cong \left(Rot_{-\Delta\theta} - \Delta\hat{\theta} \begin{bmatrix} 0 & -1 \\ 1 & 0 \end{bmatrix}\right)(x(-nT) + \tilde{x}(-nT)) \quad (12)$$

$$\cong Rot_{-\Delta\theta}x(-nT) + Rot_{-\Delta\theta}\tilde{x}(-nT) - \Delta\hat{\theta}\begin{bmatrix} 0 & -1 \\ 1 & 0 \end{bmatrix}x(-nT)$$

Taking into account errors in the odometry information, the estimated positions of the own-vehicle at the respective timings for up to N cycles previous to the current cycle can be expressed as the equation (13).

(Eq. 6) (13)
$$\hat{x}(-(n+1)T) \cong x(-(n+1)T) + Rot_{-\Delta\theta}\tilde{x}(-nT) -$$
$$\Delta\hat{\theta}\begin{bmatrix} 0 & -1 \\ 1 & 0 \end{bmatrix}x(-nT) + \begin{bmatrix} 0 \\ -\hat{v}T \end{bmatrix}$$
$$= x(-(n+1)T) + Rot_{-\Delta\theta}\tilde{x}(-nT) +$$
$$T\left[\begin{bmatrix} 0 \\ -\hat{v} \end{bmatrix} - \begin{bmatrix} 0 & -1 \\ 1 & 0 \end{bmatrix}x(-nT)\right]\begin{bmatrix} \tilde{v} \\ \tilde{\omega} \end{bmatrix}$$
$$= x(-(n+1)T) + Rot_{-\Delta\theta}\tilde{x}(-nT) + [c_{\tilde{v}}, c_{\tilde{\omega}}][\tilde{v}, \tilde{\omega}]^T$$

where
$$[c_{\tilde{v}}, c_{\tilde{\omega}}] = T\left[\begin{bmatrix} 0 \\ -\hat{v} \end{bmatrix} - \begin{bmatrix} 0 & -1 \\ 1 & 0 \end{bmatrix}x(-nT)\right]$$

Taking into account the error variances, the estimated positions of the own-vehicle can be expressed as a probability distribution (in the present embodiment, a normal probability distribution) given by the equation (14).

(Eq. 7)
$$x(-(n+1)T) \sim N(x(-(n+1)T), P_{-(n+1)T}) \quad (14)$$

where
$$P_{-(n+1)T} = Rot_{-\Delta\theta}P_{-nT}Rot^T_{-\Delta\theta} + [c_{\tilde{v}}, c_{\tilde{\omega}}]\mathrm{diag}([\sigma_v^2, \sigma_\omega^2])$$
$$[c_{\tilde{v}}, c_{\tilde{\omega}}]^T$$

In this way, at the control timing of time t1 as exemplified in FIG. 3, the control unit 10 calculates the estimated positions of the own vehicle at the respective control timings for the N cycles prior to that time, their error variances (probability distributions), and the travel trajectory 31 of the own vehicle. Thereafter, at time t2 that is T seconds after time t1, the control unit 10 again calculates the estimated positions of the own vehicle at the respective timings for up to the previous n cycles, their error variances (probability distributions), and the travel trajectory 31 of the own vehicle. In such a way, the estimated positions of the own vehicle at the respective control timings for up to the previous N cycles, their error variances (probability distributions), and the travel trajectory 31 of the own vehicle are updated every control timing.

(3-2) Calculation of Adjacent Lane Probability Map (S140)

In step S140, the control unit 10 calculates the adjacent lane probability map. First, definition of the adjacent lane based on the estimated position of the own-vehicle at time t=−T that is one cycle earlier than certain control timing (time t=0) will be described with reference to FIG. 4(a). In the present embodiment, it is assumed that a lane width is 3.5 m.

Figure 4A:
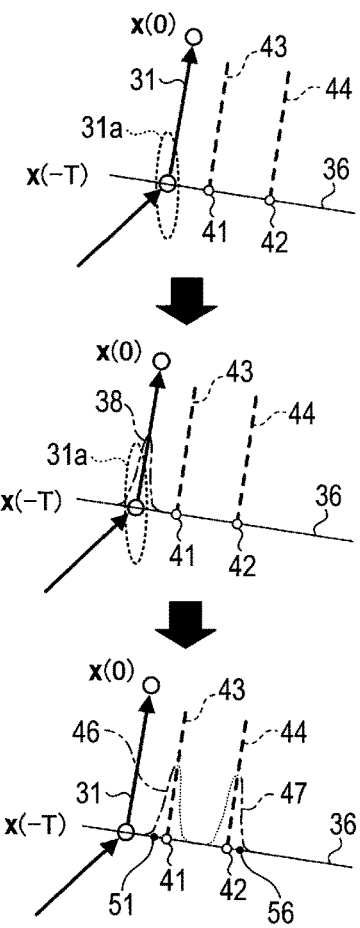
FIG. 4A is an explanatory view illustrating calculation of an adjacent lane probability map.

As shown in FIG. 4(a), in the upper section, the control unit 10 defines a vehicle-widthwise line 36 that is a line passing through the estimated position of the own-vehicle at time t=−T and being perpendicular to the travel trajectory 31 of the own vehicle from the estimated position at time t=−T to the current position of the own-vehicle. The control unit 10 defines an inside estimated partitioning position 41 that is a position on the vehicle-widthwise line 36 a predetermined distance (e.g., one half the vehicle width, that is, 1.75 m) apart from the estimated position of the own-vehicle at time t=−T, and subsequently defines an estimated outer partitioning position 42 that is a position on the vehicle-widthwise line 36 the vehicle-width (3.5 m) further away from the inside estimated partitioning position 41.

In such a manner, an adjacent lane for up to the previous one cycle can be estimated as a region between the inside estimated partition line 43 perpendicular to the vehicle-widthwise line 36 and passing through the inside estimated partitioning position 41 and the outside estimated partition line 44 perpendicular to the vehicle-widthwise line 36 and passing through the estimated outer partitioning position 42.

Figure 4B:
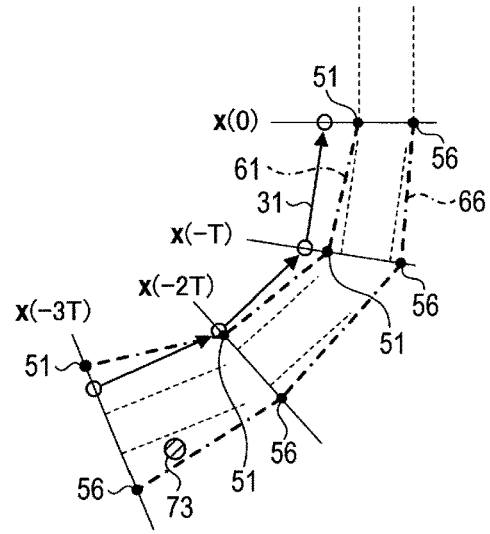
FIG. 4B is an explanatory view of a calculated adjacent lane probability map.

Subsequently, as shown in FIG. 4 (a), in the middle section, the control unit 10 calculates a lane-widthwise probability distribution 38 of the own vehicle for the estimated position of the own-vehicle, taking onto account the odometry information. More specifically, the control unit 10 calculates the lane-widthwise probability distribution (estimated range of existence) 38 of the own vehicle by projecting the error variance 31a in the estimated position of the own-vehicle onto the lane-widthwise direction. That is, lane-widthwise blurring of the estimated position of the own-vehicle is estimated.

As shown in FIG. 4 (a), in the lower section, assuming that the probability distribution 38 of the own vehicle is also a probability distribution of each of the estimated partitioning positions 41, 42, the control unit 10 simply applies the probability distribution 38 of the own vehicle to each of the estimated partitioning positions 41, 42. More specifically, an inside probability distribution 46 is calculated by applying the probability distribution 38 of the own vehicle to the estimated partitioning position 41 such that the peak value of the probability distribution 38 yields a peak value of the probability distribution at the estimated inside partitioning position 41 (that is, the probability distribution of the estimated partitioning position 41 is calculated by lane-widthwise translation of the probability distribution 38 of the own vehicle). An outside probability distribution 47 is calculated by applying the probability distribution 38 of the own vehicle to the estimated partitioning position 42 such that the peak value of the probability distribution 38 yields a peak value of the probability distribution at the outside estimated partitioning position 47.

It should be noted that due to errors in measurement by sensors to detect the odometry information, the probability values may abruptly change from those of the previous control timing (control timing of the preceding cycle). In the present embodiment, the probability value at each estimated position of the own-vehicle is smoothed using the probability values at the estimated position of the own-vehicle calculated at earlier control timings.

More specifically, in the present embodiment, the probability value is smoothed using the probability value of the preceding cycle according to the equation (15), where a is a forgetting factor.

(Eq. 8)

$$\hat{P}(t)=(1-a)\hat{P}(t-1)+aP(T), 0 \leq a \leq 1 \quad (15)$$

Smoothing the probability values in such a manner can prevent impacts of abrupt changes in the probability value due to the errors in measurement by the sensors.

In the present embodiment, an actually meaningful distribution region of the inside probability distribution 46 (a region used in later calculation) is a region on the left side (on the travel trajectory 31 side) of the peak value of the inside probability distribution 46. In the following, therefore, Reference herein to the inside probability distribution 46 means the region on the left side of the peak value. An actually meaningful distribution region of the outside probability distribution 47 is a region on the right side (on the own vehicle travel trajectory 31 side) of the peak value of the outside probability distribution 47. In the following, therefore, reference herein to the outside probability distribution 47 means the region on the right side of the peak value.

The control unit 10 defines an inside specific-variance position 51 where the existence probability of the inside estimated partitioning position 41 takes a probability of P1 and an outside specific-variance position 56 where the existence probability of the outside estimated partitioning position 42 takes a probability of P1. In some embodiment, the control unit 10 may define a plurality of inside specific-variance positions 51 where the existence probability of the outside estimated partitioning position 42 takes different values and a plurality of outside specific-variance positions 56 where the existence probability of the outside estimated partitioning position 42 takes different values.

Such processing is repeatedly performed every control timing for up to the previous N cycles in a similar manner.

As shown in FIG. 4 (b), the control unit 10 calculates an inside partition line map 61 by connecting the inside specific-variance positions 51 of the same existence probability P1 at the respective control timings for up to the previous N cycles. Similarly, the control unit 10 calculates an outside partition line map 66 by connecting the outside specific-variance positions 51 of the same existence probability P1 at the respective control timings for up to the previous N cycles. The adjacent lane probability map is thus calculated. That is, the adjacent lane probability map represents a region between the inside partition line map 61 and the outside partition line map 66 is a region where the existence probability of the adjacent lane is P1.

Given the adjacent lane probability map of the existence probability P1 calculated as shown in FIG. 4 (b), if a target 73 detected by the radar unit is present in the adjacent lane probability map, then it can be determined that the existence probability of the target in the adjacent lane is equal to or greater than P1. If a target 73 detected by the radar unit is present outside the adjacent lane probability map, then it can be determined that the existence probability of the target in the adjacent lane is less than P1.

A plurality of existence probabilities of each of the estimated partitioning positions 41, 42 may be defined. In such an embodiment, the inside and outside partition line maps may be calculated for each of the plurality of existence probabilities (thus the adjacent lane probability map may be calculated for each of the plurality of existence probabilities), which allows the existence probability of a target in the adjacent lane to be calculated in a finer manner.

Figure 5:
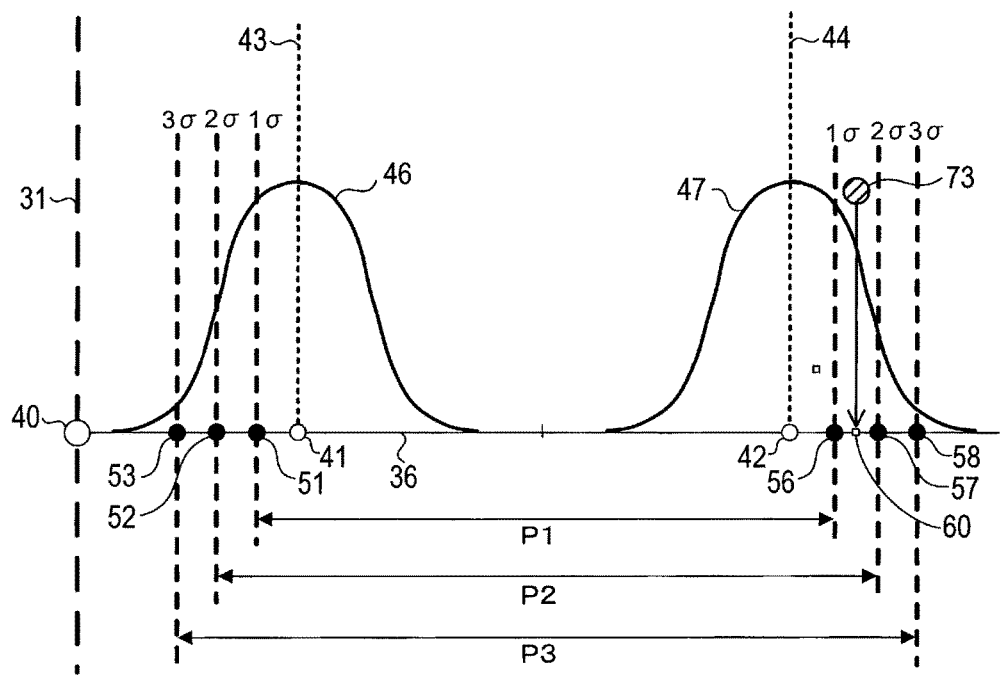
FIG. 5 is an explanatory view illustrating a probability distribution of an adjacent lane.

FIG. 5 illustrates the probability distribution of the adjacent lane for the estimated position of the own-vehicle at the control timing a few cycles earlier than the current cycle. As shown in FIG. 5, the inside probability distribution 46 that is a probability distribution of the inside estimated partition line 43 is centered at the inside estimated partitioning position 41, and the outside probability distribution 47 that is a probability distribution of the outside estimated partition line 44 is centered at the outside estimated partitioning position 42.

A position of the highest existence probability of the inside estimated partition line 43 is, of course, the inside estimated partitioning position 41. The existence probability of the inside estimated partition line 43 decreases with increasing distance between the inside estimated partition line 43 and the inside estimated partitioning position 41. In the present embodiment, three positions on the vehicle-widthwise line 36, which correspond to three different probability values of the probability distribution, are defined. More specifically, in the present embodiment, a position of a probability P1 which corresponds to 1σ of the normal probability distribution is defined as an inside first-variance position 51, a position of a probability P2 which corresponds to 2σ of the normal probability distribution is defined as an inside second-variance position 52, and a position of a probability P3 which corresponds to 3σ of the normal probability distribution is defined as an inside third-variance position 53, where P1>P2>P3.

Similarly, a position of the highest existence probability of the outside estimated partition line 43 is, of course, the outside estimated partitioning position 42. The existence probability of the outside estimated partition line 44 decreases with increasing distance between the outside estimated partition line 44 and the outside estimated partitioning position 42. In the present embodiment, three positions on the vehicle-widthwise line 36, which corresponds to three different probability values of the probability distribution (equal to the above three probability values of the inside probability distribution 46), are defined. More specifically, in the present embodiment, a position of a probability P1 which corresponds to 1σ of the normal probability distribution is defined as an outside first-variance position 56, a position of a probability P2 which corresponds to 2σ of the normal probability distribution is defined as an outside second-variance position 57, and a position of a probability P3 which corresponds to 3σ of the normal probability distribution is defined as an outside third-variance position 58, where P1>P2>P3.

Figure 6:
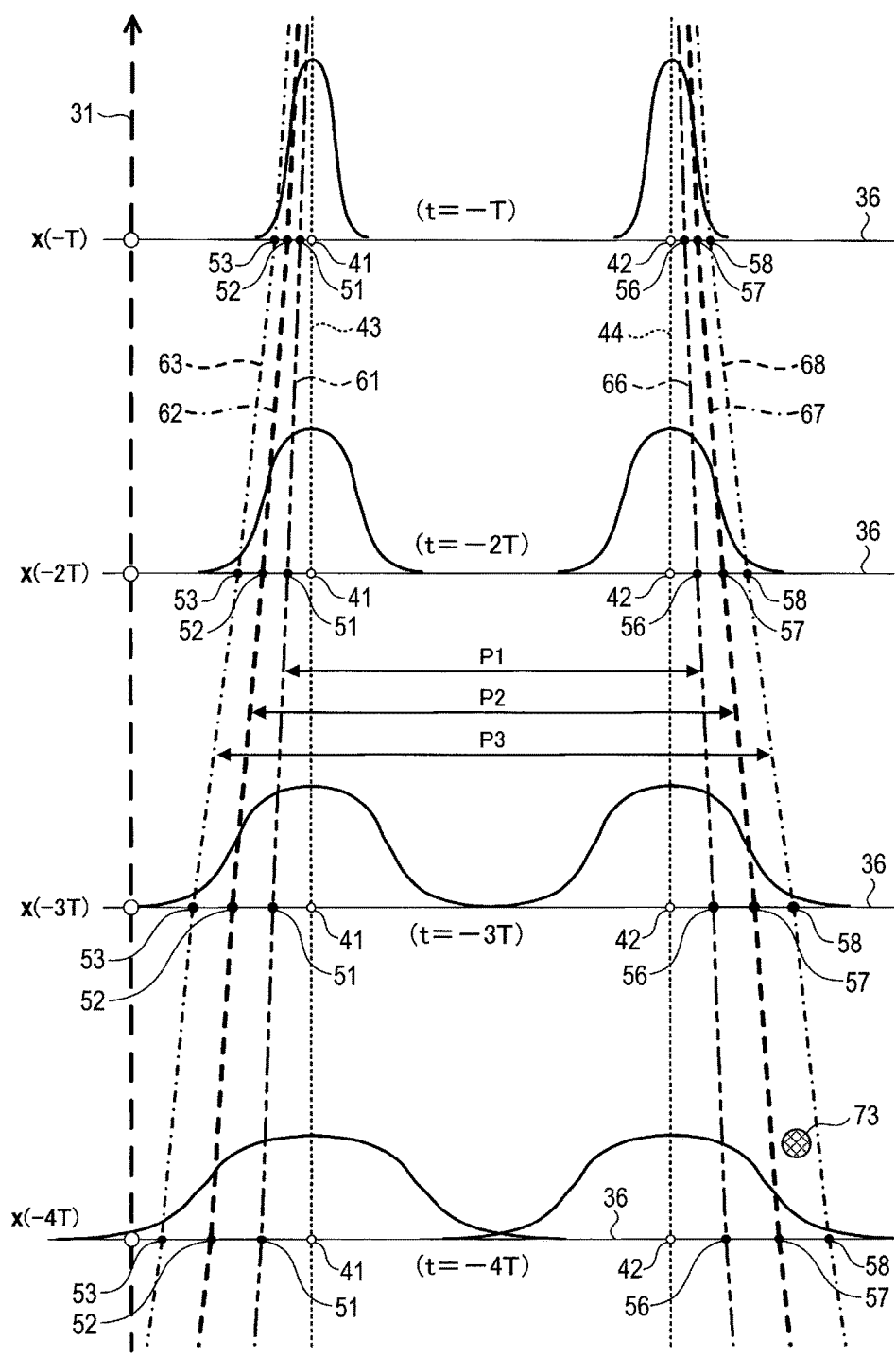
FIG. 6 is an example of an adjacent lane probability map.

As exemplified in FIG. 6, the control unit 10 calculates a first inside partition line map 61 by connecting inside first-variance positions 51 of the same existence probability P1 at the respective control timings for up to the previous N cycles. Similarly, the control unit 10 calculates a second inside partition line map 62 by connecting inside second-variance positions 52 of the same existence probability P2 at the respective control timings for up to the previous N cycles. The control unit 10 further calculates a third inside partition line map 63 by connecting inside third-variance positions 53 of the same existence probability P3 at the respective control timings for up to the previous N cycles.

In a similar manner, the control unit 10 calculates a first outside partition line map 66 by connecting outside first-variance positions 56 of the same existence probability P1 at the respective control timings for up to the previous N cycles. Similarly, the control unit 10 calculates a second outside partition line map 67 by connecting outside second-variance positions 57 of the same existence probability P2 at the respective control timings for up to the previous N cycles. The control unit 10 further calculates a third outside partition line map 68 by connecting outside third-variance positions 58 of the same existence probability P3 at the respective control timings for up to the previous N cycles.

The adjacent lane probability map of the probability P1 represents a region between the inside partition line map 61 and the outside partition line map 66. If a target detected by the radar unit is present in this region, then it can be determined that the existence probability of the target in the adjacent lane is P1.

The adjacent lane probability map of the probability P2 represents a region between the inside partition line map 62 and the outside partition line map 67. If a target detected by the radar unit is present in this region, but not present in the region represented by the adjacent lane probability map of the probability P1, then it can be determined that the existence probability of the target in the adjacent lane is P2.

The adjacent lane probability map of the probability P3 represents a region between the inside partition line map 63 and the outside partition line map 68. If a target detected by the radar unit is present in this region, but present neither in the region represented by the adjacent lane probability map of the probability P1 nor in the region represented by the adjacent lane probability map of the probability P2, then it can be determined that the existence probability of the target in the adjacent lane is P3.

In the example of FIG. 6, a target 73 is situated outside the region represented by the adjacent lane probability map of the probability P2 and within the region represented by the adjacent lane probability map of the probability P3. Therefore, in this example, it can be determined that the existence probability of the target 73 in the adjacent lane is P3.

Although various methods can be envisaged to determine the presence or absence of a target 73 in the region presented by the adjacent lane probability map, the following simplified method may be employed. In the simplified method, a vehicle-widthwise line 36 that is closest to the target 73 is selected from the vehicle-widthwise lines 36 calculated at the respective timings for up to the previous N cycles, and as shown in FIG. 5, a perpendicular is dropped from the target 73 onto the selected vehicle-widthwise line 36 to calculate a target's corresponding position 60 where the perpendicular and the selected vehicle-widthwise line 36 intersect.

If the target's corresponding position 60 is situated between the first-variance positions 51, 56 on the vehicle-widthwise line 36 (i.e., in the region represented by the adjacent lane probability map of the probability P1), then the existence probability of the target 73 in the adjacent lane is determined to be P1.

If the target's corresponding position 60 is situated between the second-variance positions 52, 57 on the vehicle-widthwise line 36 (i.e., in the region represented by the adjacent lane probability map of the probability P2), but not between the first-variance positions 51, 56 on the vehicle-widthwise line 36, then the existence probability of the target 73 in the adjacent lane is determined to be P2. If the target's corresponding position 60 is situated between the third-variance positions 53, 58 on the vehicle-widthwise line 36 (i.e., in the region represented by the adjacent lane probability map of the probability P3), but not between the second-variance positions 52, 57 on the vehicle-widthwise line 36, then the existence probability of the target 73 in the adjacent lane is determined to be P3.

(3-3) Calculation of Wall History (S150)

Figure 7:
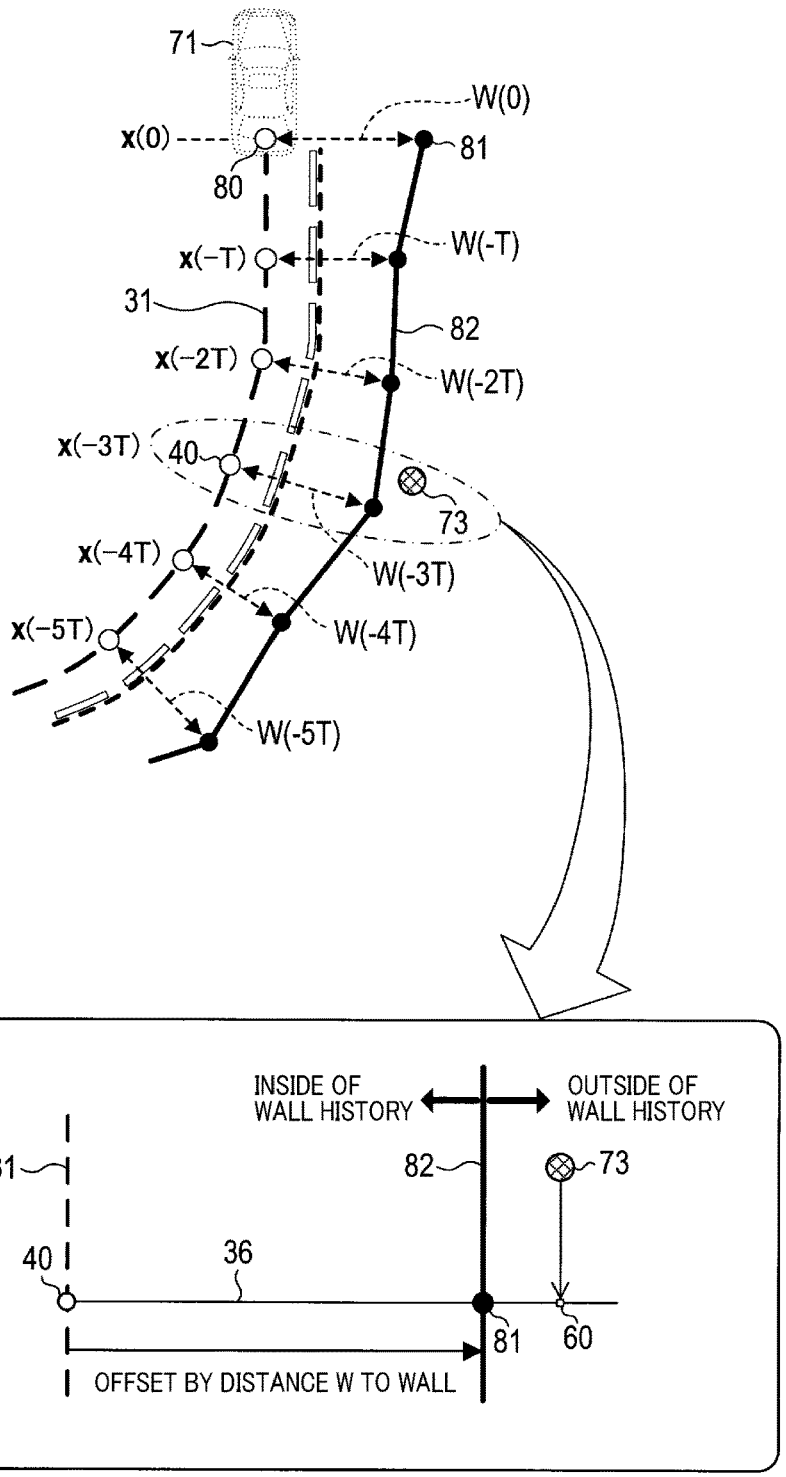
FIG. 7 is an explanatory view illustrating calculation of a wall history.

In the wall history calculation processing in step S150, based on a position of a wall acquired from the radar unit 21, the control unit 10 calculates a distance between the own vehicle (vehicle 71) and the wall just adjacent to the own vehicle. More specifically, as shown in FIG. 7, if a wall is detected in a direction perpendicular to the travel trajectory of the own vehicle from the estimated position of the own-vehicle in the previous cycle (that is one cycle prior to the current cycle) to the current position 80 of the own vehicle (i.e., in the vehicle widthwise direction) the control unit 10 calculates a distance W (0) from the current position 80 of the own vehicle to the wall 81 (which distance is perpendicular to the travel trajectory of the own vehicle).

The detection of the wall 81 and the calculation of the distance W to the wall 81 are performed every control period. Thus, information about the presence or absence of the wall 81 and the distance W to the wall 81 acquired at the respective control timings for up to at least the N previous cycles is cumulatively stored in the control unit 10.

Based on the positions of the wall 81 acquired at the respective control timings for the previous N cycles, the control unit 10 calculates positions of the wall 81 at the respective control timings for the previous N cycles by offsetting each of the position 80 of the own vehicle acquired at the current control timing and the estimated positions of the own-vehicle 40 acquired at the respective control timings for N cycles previous to the current cycle, in a direction toward the wall 81 by a distance W to the wall 81 at the corresponding control timing. The control unit 10 calculates a wall history 82 that is a line connecting the positions of the wall 81 at the respective control timings for the previous N cycles. That is, the wall history 82 is a trajectory of the wall for a period from the current cycle to the cycle that is N cycles previous to the current cycle.

When the wall history 82 has been calculated in such a manner, the existence probability of the adjacent lane in a region outside of the wall history 82 determined to be zero. Accordingly, if the target 73 is situated in such a region outside of the wall history 82, the existence probability of the target 73 in the adjacent lane is determined to be zero.

Although various methods can be envisaged to determine the presence or absence of a target 73 situated in a region outside of the wall history 82, a simplified method may be employed that is similar to the method described as above with reference to FIG. 5 to determine the presence or absence of a target 73 in the region presented by the adjacent lane probability map.

In the simplified method, as shown in FIG. 7, a vehicle-widthwise line 36 that is closest to the target 73 is selected from the vehicle-widthwise lines 36 calculated at the respective timings for up to the previous N cycles, and a perpendicular is dropped from the target 73 onto the selected vehicle-widthwise line 36 to calculate a target's corresponding position 60 where the perpendicular and the selected vehicle-widthwise line 36 intersect.

If the target's corresponding position 60 is situated on the selected vehicle-widthwise line 36 and outside of the wall history 82, then the existence probability of the target 73 in the adjacent lane is determined to be zero. If the target's corresponding position 60 is situated on the selected vehicle-widthwise line 36 and inside of the wall history 82, then the existence probability of the target 73 in the adjacent lane is determined according to the adjacent lane probability map as described above with reference to FIGS. 4 and 5.

That is, the existence probability of the target 73 in the adjacent lane is essentially determined based on the adjacent lane probability map, as described with reference to FIGS. 4 and 5. However, if a wall 81 is detected and its wall history 82 is then calculated, the existence probability of a target 73 outside of the wall history 82 is determined to be zero regardless of the adjacent lane probability map.

In the present embodiment, the vehicle-mounted system 1 corresponds to an adjacent lane monitoring apparatus. FIG. 1B illustrates a functional block representing functions of the control unit 10 which are embodied by a processor, software, or these combinations of them. The control unit 10 includes an odometry acquisition unit 101, a travel trajectory calculation unit 102, an adjacent lane estimation unit 103, an other-vehicle determination unit 106, a specific-processing unit 107, and an other-vehicle state determination unit 108. The odometry acquisition unit 101 performs the operation of step S120. The travel trajectory calculation unit 102 performs the operation of step S130. The adjacent lane estimation unit 103 performs the operation of step S140. The other-vehicle determination unit 106 performs the operations of steps S160-S170. The specific-processing unit 107 performs the operation of step S190. The other-vehicle state determination unit 108 performs the operation of step S180. The adjacent lane estimation unit 103 includes a probability distribution calculation unit 104 and a region estimation unit 105 each configured to perform part of the operation of step S140.

(4) Advantages

With the vehicle-mounted system 1 of the present embodiment, the travel trajectory calculation unit 102 calculates the travel trajectory of the own vehicle based on the odometry information acquired by the odometry acquisition unit 101. The adjacent lane estimation unit 103 calculates a region in which an adjacent lane exists, based on the travel trajectory of the own vehicle. A position of a target (e.g., a vehicle other than the own vehicle) is detected by the radar unit 3 that serves as an other-vehicle detector. The other-vehicle determination unit 106 determines whether or not the other vehicle is present in the adjacent lane based on the position of the target and the region in which the adjacent lane exists. With this configuration, whether or not a vehicle other than the own vehicle is present in the adjacent lane can be properly estimated.

In the present embodiment, estimated positions of the own-vehicle at the respective control timings for N cycles previous to the current cycle are calculated. Based on the estimated positions of the own-vehicle at the respective previous control timings, a travel trajectory of the own vehicle is calculated. With this configuration, the travel trajectory of the own vehicle for up to the previous N cycles can be properly calculated.

Taking into account error factors for the odometry information, an error variance in each of the estimated positions of the own-vehicle at the respective previous timings is calculated. The probability distribution of each estimated position of the own vehicle (probability distribution of the own vehicle) in the lane-widthwise direction is calculated by projecting the error variance in the estimated position of the own-vehicle onto the lane-widthwise direction.

The probability distribution calculation unit 104 calculates positions of lane partition lines defining the adjacent lane (the inside partitioning position 41 and the outside partitioning position 42) by translating the estimated positions of the own vehicle at the respective previous control timings in the vehicle-widthwise direction. Thereafter, the probability distribution calculation unit 104 simply applies the probability distribution of the own vehicle to each of the positions of the lane partition lines defining the adjacent lane to calculate the probability distribution of each of the lane partition lines (the inside probability distribution 46 and the outside probability distribution 47), whereby the probability distribution of the adjacent lane at each of the respective previous control timings is calculated. Based on the probability distribution of the adjacent lane at each of the respective previous control timings, the region estimation unit 105 calculates the adjacent lane probability map (a map representing a region where the existence probability of the adjacent lane takes a specific probability).

That is, taking into account the errors in the odometry information, the region where the adjacent lane exists is calculated as a map corresponding to the probability distribution. Based on the adjacent lane probability map, the other-vehicle determination unit 106 calculates a probability value to determine whether or not a target is present in the adjacent lane. Despite the presence of errors in the odometry information, the final determination as to whether or not a target is present in the adjacent lane can be made properly based on the existence probability of the target in the adjacent lane.

In the present embodiment, even if it is determined that a target is present in the adjacent lane, an alert is not output depending on a positional relationship between the own vehicle and the target. That is, if it is determined that a target is present in the adjacent lane and if the a positional relationship between the own vehicle and the target satisfies a predetermined condition, an alert will be output. With this configuration, the alert can be output at the proper timing.

OTHER EMBODIMENTS

An embodiment of the present invention has so far been described. However, the present invention should not be construed as being limited to the foregoing embodiment, but may be modified in various modes.

(1) In the above embodiment, the existence probability of a target in the adjacent lane is calculated using the simplified method. Alternatively, the existence probability of a target in the adjacent lane may be calculated using another method. That is, in the above embodiment, a perpendicular is dropped from the target onto the vehicle-widthwise line 36 that is closest to the target to calculate a target's corresponding position 60 where the perpendicular and the selected vehicle-widthwise line 36 intersect. A probability of the target's corresponding position 60 in the adjacent lane probability distribution is calculated as the existence probability of the target in the adjacent lane. Alternatively, the existence probability of the target in the adjacent lane may be calculated using another method than the simplified method described above.

(2) Only the adjacent lane probability map corresponding to one specific probability (e.g., P1) may be calculated. The existence probability of the target in the adjacent lane may be calculated using this adjacent lane probability map.

(3) In the above embodiment, the odometry information used to calculate the travel trajectory of the own vehicle includes a vehicle speed v, a yaw rate ω, and a turning radius R. These are, however, only examples, and it is contemplated that what to employ as the odometry information may be determined as desired.

(4) If it is determined that a target is present in an adjacent lane, an alert may be output regardless of a distance to the target or a rate of decrease in the distance to the target.

(5) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

The invention claimed is:

1. An apparatus for monitoring an adjacent lane to a lane in which an own vehicle is traveling, the own vehicle being a vehicle carrying the apparatus, the apparatus comprising:
   a control processing unit (CPU);
   an other-vehicle detector comprising radar sensors, configured to detect, using the radar sensors, other-vehicle position information indicative of a position of another vehicle around the own vehicle relative to the own vehicle;
   an odometry acquisition unit configured to acquire, using the CPU, odometry information indicative of a driving state of the own vehicle;
   a travel trajectory calculation unit configured to, using the CPU and based on the odometry information acquired by the odometry acquisition unit, calculate a travel trajectory of the own vehicle by calculating estimated positions of the own vehicle at respective control timings until N cycles prior to the current cycle relative to a current position of the own vehicle as an origin and connecting the current and estimated positions of the own-vehicle;
   an adjacent lane estimation unit configured to, using the CPU and based on the travel trajectory of the own vehicle calculated by the travel trajectory calculation unit, estimate an adjacent-lane region that is a region where the adjacent lane is present without using the other-vehicle position information; and
   an other-vehicle determination unit configured to, using the CPU and based on the other-vehicle position information detected by the other-vehicle detector and the adjacent-lane region estimated by the adjacent lane estimation unit, determine whether or not the other vehicle is present in the adjacent lane,
   wherein in response to determining that the other vehicle is present in the adjacent lane, the CPU outputs an alert to notify a driver of the presence of the other vehicle.

2. The apparatus according to claim 1, further comprising:
   a probability distribution calculation unit configured to, based on error factors for the odometry information acquired by the odometry acquisition unit, calculate an adjacent lane probability distribution indicative of a distribution of existence probability of the adjacent-lane region; and
   a region estimation unit configured to, based on the adjacent lane probability distribution calculated by the probability distribution calculation unit, estimate, for each of at least one specific probability value, a region where the existence probability of the adjacent-lane region is equal to the specific probability value as a specific adjacent-lane region corresponding to the specific probability value,
   wherein the other-vehicle determination unit is configured to determine in which region of at least one specific adjacent-lane region estimated by the region estimation unit respectively corresponding to the at least one specific probability value the position of the other vehicle indicated by the other-vehicle position information detected by the other-vehicle detector exists, and based on the determination result, determine whether or not the other vehicle is present in the adjacent lane.

3. The apparatus according to claim 2, wherein the probability distribution calculation unit is configured to calculate the adjacent lane probability distribution in a lane-widthwise direction of the adjacent lane.

4. The apparatus according to claim 3, wherein the probability distribution calculation unit is configured to calculate the adjacent lane probability distribution as a probability distribution according to a normal probability distribution.

5. The apparatus according to claim 1, wherein the travel trajectory calculation unit is configured to calculate past positions of the own vehicle relative to the current position of the own vehicle at respective past control timings of a predetermined control period for a predetermined number of control periods previous to the current control timing, and based on the calculated positions of the own vehicle at the respective past control timings and the current position of the own vehicle, calculate the travel trajectory of the own vehicle.

6. The apparatus according to claim 1, further comprising an other-vehicle state determination unit configured to, if it is determined by the other-vehicle determination unit that the other vehicle is present in the adjacent lane, determine whether or not the other vehicle is in a specific state to the own vehicle,
   wherein the specific state comprises at least one of a state that a relative distance which is a distance between the other vehicle and the own vehicle is equal to or less than a predetermined distance and a state that a rate of decrease in the relative distance is equal to or greater than a predetermined rate of decrease, and
   wherein a specific-processing unit is configured to, if it is determined by the other-vehicle determination unit that the other vehicle is present in the adjacent lane and if it is determined by the other-vehicle state determination unit that the other vehicle is in the specific state, output an alert indicating the presence of an object.

* * * * *